3,144,298
METHOD OF TREATING CELLULOSIC MATERIALS AND PRODUCT THEREBY FORMED
Clifford H. Hullinger and René R. Carrasco, Chicago, Ill., assignors to American Maize-Products Company, a corporation of Maine
No Drawing. Filed Oct. 27, 1959, Ser. No. 848,902
8 Claims. (Cl. 8—115.6)

The method of the present invention is particularly adapted for use in treating paper and like cellulosic materials to provide a product with exceptional wet strength characteristics.

We have now discovered that when paper, such as ordinary filter paper, having little if any wet strength is treated with starch and an alkali metal salt of trimetaphosphoric acid such as sodium trimetaphosphate and these two reagents are caused to react in situ, within the interstices of the paper, the resulting product will have exceptionally high wet strength.

While we do not know the exact mechanism of the way in which the reagents impart wet strength characteristics to the cellulosic material we believe that the polyfunctional trimetaphosphate salt reacts with hydroxyl groups in different starch molecules and with hydroxyl gorups in the cellulosic material to form a primary chemical bond which cross-links the starch molecules to one another and to the molecules of the cellulosic material so that the starch and cellulose molecules are all bonded together in a single giant molecule. This is indicated by the fact that our wet strength characteristics are only achieved when reaction between the starch and trimetaphosphate salt takes place in situ at a time when reactive groups of the trimetaphosphate salt are available for cross-linking the starch and cellulosic material and in actual tests we found that paper treated with starch which had previously been cross-linked with the trimetaphosphate salt so that there were no reactive trimetaphosphate salt groups available, showed little if any increase in wet strength over the untreated paper. But, regardless of the exact mechanism or reaction which may finally be proven for the way in which the starch and trimetaphosphate salt are effective for imparting wet strength to the treated product, the fact remains that the starch and trimetaphosphate salt are extremely effective for achieving a product with exceptional wet strength characteristics.

There are a number of different ways in which the details of the method of the present invention may be carried out. In one preferred way an aqueous dispersion is made up which contains starch and an alkali metal salt of trimetaphosphoric acid such as sodium trimetaphosphate and alkali in a catalytic amount. The cellulosic material to be treated is then added to the starch dispersion which is thereafter heated to accelerate reaction. After reaction is completed the produce is dried as by passing it through squeeze rolls to remove excess liquid and then the cellulosic material is dried. If desired the reaction dispersion may be heated to initiate reaction and then the paper may be added to the dispersion provided that it is added before reaction is complete.

As to ingredients, any kind of starch such as corn, potato, tapioca, sago, rice, barley or wheat and mixtures thereof may be employed in carrying out the present invention, and the selected starch may be pregelatinized or otherwise modified, as by acid treating, oxidation and the like. Partially cross-linked starches may also be used. In all cases the selected starch must contain at least one reactive hydroxyl group per molecule. The amount of starch employed in the aqueous slurry will vary depending upon the desired results but in general about 1.0% to about 50.0% of starch solids by weight of water is adequate for our purpose.

Any alkali metal salt of trimetaphosphoric acid such as the sodium potassium and ammonium salts can be used in the starch slurry. The exact amount of trimetaphosphate salt employed in the slurry is not critical and even very minor amounts of the salt are operative for achieving results in accordance with the present invention. In general, we prefer to employ about 1.0% to about 20.0% of trimetaphosphate salt based on the weight of starch in the slurry.

The trimetaphosphoric acid salts are used to great advantage in carrying out the method of the present invention. These salts are crystalline solids which readily dissolve in water and since the salts are not volatile at reaction temperature there is no problem with evaporation of reagents. Since the reaction products of the salts are non-toxic they may be used to advantage in treating paper and other cellulosic container materials which are employed for packaging foodstuffs.

Any of the commercially available alkalies such as the alkali metal hydroxides, carbonates, phosphates or organic bases may be employed to catalyze the reaction. For example sodium or potassium hydroxide, sodium or potassium carbonates and phosphates, trisodium phosphate, ammonium hydroxide or ammonium carbonate, alkylamines, mono-, di- and tri-ethanolamines or substituted quaternary ammonium hydroxides may be employed. The pH of the slurry for reaction will depend upon the reactivity of the particular trimetaphosphate salt employed and type of starch that is used. In general, the pH is maintained on the alkaline side and preferably between about 8.0 to about 11.0 for control of speed of reaction.

The temperature employed is that which will cause reaction between the particular starch and trimetaphosphate salt employed, and in general as the temperature increases the rate of reaction will increase. We have achieved excellent results by heating the reaction mixture to a temperature of about 100° F. to about 300° F. and although the reaction may be carried out at ordinary room temperature the rate of reaction is in general too slow for commercial purposes. On the other hand, at high temperatures and high pH levels the reaction is rapid and there is a tendency for the solution to thicken. In order to avoid difficulties of application to the cellulosic material we prefer to apply the mixture while it is a free flowing liquid.

We prefer to use gelatinized starch for achieving the desired results and in such case the starch may be pregelatinized or gelatinized during reaction. The gelatinization of starch during reaction depends upon the temperature and the pH of the reaction mixture and if the starch granules are to be gelatinized during reaction the temperature of the slurry is preferably maintained above about 120° F. for most of the commercially available starches.

Care should be taken however to avoid driving the reaction to completion prior to applying the mixture to the cellulosic material. Speed of reaction depends on pH and temperature and in general we have found that a reaction mixture at a pH of about 10.6 may be heated to a temperature of 120° F. and held at such temperature for about four hours without completing the reaction between the starch and the trimetaphosphate salt. At higher temperature and/or pH the reaction will of course proceed more rapidly. For example at pH 10.6 the reaction mixture may be heated to 160° F. for about fifteen minutes without completing the reaction.

Another convenient way to avoid completion of the reaction before applying the mixture to the cellulosic material is to gelatinize the starch granules in aqueous dispersion and then allow the dispersion to cool to 100° or less before adding the selected alkali metal salt of trimetaphosphoric acid. At such low temperatures reaction of the salt is relatively slow so that ample time will be provided for applying it to the cellulosic material.

The temperature at which the treated cellulosic material is dried may vary depending upon the equipment at hand for carrying out the drying operation but if desired the treated cellulosic material may be dried at ordinary room temperature.

The time required for completing the in situ reaction and drying of treated cellulosic material will vary from about 5 minutes to 5 hours. Drying time may be as low as a few seconds when the treated cellulosic material is passed through a heating chamber. Preferably the treated paper is dried at a temperature of at least about 150° F. At this temperature the treated cellulosic material will dry quite rapidly and at such low temperature there is no tendency to char or otherwise degrade the cellulosic material.

Any of the commercially available cellulosic materials may be employed and we have achieved excellent results with paper, fiberboard, textile fabrics, and the like commercially available cellulosic materials.

The equipment employed for carrying out the process of the present invention is not critical and any commercially available equipment may be employed. Agitation of the slurry to mix the ingredients is carried out by conventional means such as propeller blades, stirrers or paddle agitators of various kinds.

While the present invention is particularly adapted for use as a size to impart wet strength to cellulosic materials, it will be understood that the invention is not limited to such application and that it may be used to great advantage as for example in the manufacture of corrugated board or fiberboard wherein the starch and trimetaphosphate salt reagents are employed to bond layers of paper together and form a laminated assembly. Alternatively it may be used as an adhesive to give a bond between two or more sheets of paper with exceptionally high water resistance.

The cellulosic material may be treated in accordance with the present invention in a number of different ways depending upon the work at hand. For example, the reaction solution may be made up and then applied to a sheet of cellulosic material as a size before the solution is heated and thereafter the cellulosic material with the slurry in place thereon may be heated to cause reaction. Alternatively the slurry may be heated to initiate a partial reaction and before the reaction is completed the slurry may then be applied to the cellulosic material as a size and the reaction completed in situ thereon. If desired, the slurry may be made up without having any phosphate salt therein and the slurry may then be heated and applied to the cellulosic material. In such case the phosphate salt may be applied directly to the cellulosic material as by sprinkling it thereon either before or after the starch slurry is applied. If desired the reaction slurry may be dewatered after it has been applied to the cellulosic material and then the dewatered material may be heated to cause reaction to take place in situ. Other modifications of the details of the way in which the reaction of the present invention may be carried out will be obvious to those skilled in the art.

The following examples illustrate some of the preferred ways in which the reaction of the present invention may be carried out.

*Example I*

20 g. of commercially available thin boiling corn starch, and 4 g. of sodium carbonate were mixed in 250 g. of water. The mixture was heated to 180° F., cooled to 100° F. and then 3 g. of sodium trimetaphosphate were mixed in. A sheet of filter paper was then placed in the warm solution and maintained therein for about two minutes. Thereafter the treated paper was passed through squeeze rolls to remove excess liquid. The paper was then dried in an oven at 160° F. for about 10 minutes. The sample was allowed to cool and then immersed in water. The sample has excellent wet strength after soaking in water for 48 hours. An untreated piece of filter paper had virtually no wet strength.

*Example II*

18 g. of shredded filter paper, 9 g. of pre-gelatinized corn starch, 2.7 g. of sodium trimetaphosphate and 4 g. of sodium carbonate were dispersed in 270 g. of water. The dispersion was filtered under vacuum and the moist pad recovered was dried in an oven at about 300° F. for 10 minutes. The dried fiberboard was hard, lightweight, strong, and after 48 hours' soaking in water retained its strength and structure.

*Example III*

20 g. of thin boiling corn starch and 4.6 g. of sodium carbonate were mixed in 200 g. of water. The pH of the mixture was 10.6. The mixture was heated at about 180° F. for about 3 minutes, cooled to 100° F. and then 2 g. of sodium trimetaphosphate were mixed in. The mixture was then spread as a film 0.001 inch thick on a sheet of kraft wrapping paper by conventional means. A second sheet of paper was pressed upon the film and the laminated sample was heated in an oven at 180° F. for 5 minutes. The sample was allowed to cool and then immersed in water. After 48 hours the sample was removed from the water and adhesion between the paper sheets was excellent. Separation of the two without tearing was impossible.

In contrast a similar sample was prepared without the sodium trimetaphosphate. The resulting bond disintegrated and the paper sheets separated after a few minutes in water.

*Example IV*

The procedure, ingredients and proportion of ingredients in Example III are repeated except that potassium trimetaphosphate is used in place of sodium trimetaphosphate. The results are the same as those in Example III.

*Example V*

The procedure, ingredients and proportion of ingredients in Example III are repeated except that ammonium trimetaphosphate is used in place of sodium trimetaphosphate. The results are the same as those in Example III.

*Example VI*

25 g. of corn starch and 5 g. of sodium carbonate were mixed in 300 g. of water. The mixture was heated at about 170° F. for about 4 minutes. In the meantime the surfaces of two sheets of wrapping paper were dusted with sodium trimetaphosphate powder. The hot aqueous alkaline starch solution was spread over the dusted surface of one sheet of paper with the procedure described in Example III. The dusted surface of the second sheet was pressed into the starch film and the laminated sample was heated and dried at 185° F. for 3 minutes. After 48 hours of immersion in water the sample exhibited excellent adhesion.

A similar sample was prepared without dusting the sheets of paper with sodium trimetaphosphate. This sample separated after a few minutes in water.

*Example VII*

The procedure, ingredients and proportion of ingredients in Example VI are repeated except that potato starch is used in place of corn starch.

*Example VIII*

The procedure, ingredients and proportion of ingredients in Example VI are repeated except that wheat starch is used in place of corn starch.

It will be understood that it is intended to cover all changes and modifications of the preferred embodiment of the invention herein chosen for the purpose of illustration which do not constitute departures from the spirit and scope of the invention.

What we claim is:
1. The method of treating cellulosic material which comprises the steps of forming an aqueous physical mixture containing from about 1.0% to about 50.0% by weight of starch having at least one free hydroxyl group, from about 1.0% to about 20.0% of an alkali metal salt of trimetaphosphoric acid based on the weight of the starch and sufficient alkali to catalyze reaction between the salt and the starch, and then applying the physical mixture to cellulosic material before any substantial reaction has taken place between the ingredients thereof, maintaining the mixture in situ upon the cellulosic material while causing reaction to take place between the starch and the alkali metal salt by heating the mixture to a temperature from about 100° F. to about 300° F. in order to form a bond with the cellulosic material and increase the wet strength of the cellulosic material.

2. The method specified in claim 1 in which the alkali metal salt is sodium trimetaphosphate.

3. The method specified in claim 1 in which the alkali metal salt is potassium trimetaphosphate.

4. The method specified in claim 1 in which the starch is pregelatinized starch.

5. The method of treating cellulosic material which comprises the steps of forming an aqueous physical mixture containing from about 1.0% to about 50.0% by weight of starch having at least one free hydroxyl group, from about 1.0% to about 20.0% of an alkali metal salt of trimetaphosphoric acid based on the weight of the starch and sufficient alkali to catalyze reaction between the salt and the starch, heating the mixture to a temperature of from about 100° F. to about 300° F. to initiate the reaction, then applying the mixture to the cellulosic material before the reaction is substantially completed and maintaining the mixture upon the cellulosic material to complete the reaction in situ and increase the wet strength of the cellulosic material.

6. The method of treating cellulosic material which comprises the steps of forming an aqueous physical mixture containing from about 1.0% to about 50.0% by weight of starch having at least one free hydroxyl group and sufficient alkali to catalyze reaction between the starch and an alkali metal salt of trimetaphosphoric acid, applying an alkali metal salt of trimetaphosphoric acid to cellulosic material, then applying the mixture of starch and alkali to the cellulosic material and heating the same to a temperature of from about 100° F. to about 300° F. to cause reaction between the starch and the applied alkali metal salt, and maintaining the mixture upon the cellulosic material until reaction between the starch and the applied alkali metal salt is completed in situ to increase the wet strength of the cellulosic material.

7. The method of treating cellulosic material, which comprises the steps of forming an aqueous physical mixture containing from about 1.0% to about 50.0% by weight of starch having at least one free hydroxyl group and sufficient alkali to catalyze reaction between the starch and an alkali metal salt of trimetaphosphoric acid, applying the mixture to cellulosic material, then applying an alkali metal salt of trimetaphosphoric acid to the cellulosic material and heating the same to a temperature of from about 100° F. to about 300° F. to cause reaction between the starch and the applied alkali metal salt, and maintaining the mixture upon the cellulosic material until reaction between the starch and the applied alkali metal salt is completed in situ to increase the wet strength of the cellulosic material.

8. A product prepared in accordance with the method of claim 1.

References Cited in the file of this patent
UNITED STATES PATENTS

| | | |
|---|---|---|
| 2,140,394 | Ruff | Dec. 13, 1938 |
| 2,197,463 | Bradner | Apr. 16, 1940 |
| 2,524,400 | Schoene et al. | Oct. 3, 1950 |
| 2,801,242 | Kerr et al. | July 30, 1957 |
| 2,884,412 | Neukon | Apr. 28, 1959 |
| 2,884,413 | Kerr et al. | Apr. 28, 1959 |

OTHER REFERENCES

Pulp and Paper, Casey, Interscience Publishers, vol. 1, page 491, 1952.